Feb. 23, 1932. F. LOBL 1,846,648

STOPPER OR CLOSURE FOR CONTAINERS

Filed Nov. 24, 1930

Inventor
Frederick Lobl
By
Attorney

Patented Feb. 23, 1932

1,846,648

UNITED STATES PATENT OFFICE

FREDERICK LOBL, OF MIDDLEBORO, MASSACHUSETTS

STOPPER OR CLOSURE FOR CONTAINERS

Application filed November 24, 1930. Serial No. 497,865.

This invention relates generally to a stopper or closure for all kinds of receptacles, particularly those designed to contain water or other liquids, and more especially is intended for use as a closure for the filling opening of a rubber bag or other receptacle for holding crushed ice. As is known, such a bag is commonly used in hospitals and other places in the care and treatment of sick persons, and the stopper of such a bag, to be effective, must make a substantially hermetic closure or seal with the filling opening in order that there shall be no opportunity for leakage of the contents when the bag is in use.

This invention is an improvement on my stopper which is shown and described in my Patent No. 1,640,508, patented August 30, 1927. The stopper described in this patent was composed of three elements, namely, a hollow threaded body element, a cover element and a washer element. The body element has an outwardly flaring flexible flange to the under surface of which the sealing washer was secured by means of a downturned flange on the periphery of the cover element to clamp all of the elements together.

With this construction, the possibility exists that the grip upon the washer may loosen after constant wear or abuse, or if the washer be forcibly pulled out, the cover or body elements may have a tendency to twist or to slide relative to each other due to their circular shape. In this event, it might be difficult to unscrew the stopper from its socket.

By the present invention, I have eliminated the circular top cover element which served to grip the washer and the lower body element together. I now provide on the closure or body element itself, means for securing or clamping the washer to the flange thereof. The outer periphery of the flange of this body element is down-turned to securely grip the washer which encircles the body element.

Hence, it is the object of the present invention to provide a closure which is simple in construction wherein the hollow body member itself serves to seal the washer and thereby the possibility of twisting, where two metal elements are used for clamping the sealing washer, is eliminated.

For a better understanding of my invention reference may be had to the accompanying drawings in which:

Fig. 1 is a plan view of the preferred form of stopper embodying the present invention and having a part of the structure removed to illustrate the flange clamping construction;

Fig. 2 is a view in cross-section taken on the line 2—2 of Fig. 1; and

Fig. 3 is a view in section showing a modification, differing from Fig. 2 in that the washer bears against a flat under surface of the flexible flange on the closure element.

Referring to the figures, my stopper comprises, in general, a closure or body element 1, a sealing washer 2 and an inverted cup-shaped member 3 serving to enclose the hollowed portion of the body element 1.

The body element 1 and the cup-shaped element 3, as in the case of the stopper described in the above-mentioned patent, are made of suitable thin sheet metal which can be easily pressed or spun into the desired shape. The sealing washer 2 is preferably of rubber or other suitable yielding packing material.

The closure or body element 1 has an outwardly flaring, easily flexed, continuous flange or sealing portion 4 at the top thereof and a closing portion 5 serving to perform the main closing function of my stopper, and is also threaded to be adapted to be screwed into the opening in a container, indicated at 8.

The flange 4 carries the washer 2, which is permanently clamped thereto by means of an integral depending portion 6 of the flange; and also has formed therein a continuous circular bead 7 which projects downwardly to form a circular projection on the bottom surface of the flange. The washer is hence so retained against the under surface of the flange 4 as to be in a downwardly inclined position.

The closure element 1, on being screwed into the container opening, seats the washer 2 against the contacting surface of the container opening and the resiliency of the washer itself serves to provide a continuous pressure and a water-tight joint with the contacting surface. The flange 4 being of flexible material serves to back up the sealing washer 2 and thereby provides additional continued pressure for maintaining the water-tight joint with the contacting surface.

The remaining upper surface of the flange 6 may slope outwardly and upwardly to aid in providing for the maintenance of the washer 2 in an inclined position. The amount of the inclination may also depend upon the slope of the contacting surface of the container opening to be sealed. However, the precise shape is somewhat immaterial for it may slope downwardly if for the particular slope of the contacting surface the downward sloping of the flange would provide for increased backing pressure on the joint and increase the effectiveness of the seal.

In the modification shown in Fig. 3, the flange 4 has no circular bead projecting portion and is entirely flat on the under surface. An effective backing and sealing pressure is also provided with this construction. It should also be understood that the flange 4 of this construction may slope upwardly or downwardly depending upon the slope of the contacting surface of the container opening if it should be necessary to augment the backing or sealing pressure.

The inverted cup-shaped member 3 has a downwardly-extending screw-threaded wall 3a and the threads thereof conform with the inner surface of the threaded pressure element 1 to fix the inverted cup element 3 thereto. This inverted cup element 3 serves to enclose the hollow closure element 1 to provide an insulating space to prevent the transfer of heat through the stopper construction. This feature prevents the stopper from becoming too cold when used with an ice-container or too hot when used with a hot-water bag. It also serves to fill the cavity in the stopper and thereby improves the appearance thereof.

The wall 3a of the member 3 need not necessarily be screw-threaded but may be substantially straight and form a pressed fit with the threaded cavity of the body element 1 and will be held in place by friction.

It may be seen that I have provided an improved means for maintaining the sealing washer within my stopper which is simple in construction and whereby the twisting of the gripped portion of the stopper relative to the threaded portion is obviated.

I claim as my invention:

1. A stopper for containers comprising a closure element having both a threaded portion to engage the container opening and a yieldable portion adapted to flex when the stopper is tightened, a sealing washer, and means integral with said yieldable portion whereby said sealing washer is clamped to the stopper.

2. A stopper for containers comprising a closure element having both a threaded portion to engage the container opening and an integral yieldable peripheral flange overlying the edge of the container opening, and a sealing washer, said flange having an integral portion down-turned in such a manner as to permanently hold said washer in position.

3. A stopper for containers comprising a sheet-metal closure element having a threaded central portion and a peripheral flange, a sealing washer, and means integral with said flange whereby said sealing washer is clamped to the stopper.

4. A stopper for containers comprising a hollow sheet-metal closure element having a yieldable portion overlying the edge of the container opening, a sealing washer, means integral with said yieldable portion for clamping said washer to the stopper, and an inverted cup-shaped member adapted to fit tightly within said hollow closure member and thereby provide for an insulating space within the stopper.

5. A stopper for containers comprising a hollow threaded closure element having an outwardly extending easily flexed flange, a yieldable washer encircling said threaded element and contacting with the under surface of said flange, said flange having a down-turned edge at the outer periphery thereof of such form as to permanently clamp said washer to the under surface of the flange constituting a flexible backing for the washer and an inverted cup-shaped member for closing said hollow closure member to provide an insulating space therein, having external threads adapted to engage with the internal thread surface of the threaded closure member for securing said cup thereto.

6. A stopper for containers comprising a closure element having a central threaded portion and an outwardly flaring, easily flexed flange, a circular bead formed in the flange to constitute a continuous circular rib projecting from the under surface thereof a sealing washer encircling said closure element and contacting with the rib on its under surface, said closure element having integral means for securing said washer to said flange, with the washer held in a downwardly inclined position between said securing means and the resilient backing of the flexible flange, whereby a tightening of the stopper in the container flexes the flange and a continual pressure is exerted upon the washer by the flange.

7. A stopper for containers comprising a hollow threaded closure element having an outwardly-extending easily flexed flange, a circular bead formed in the flange to constitute a continuous circular rib projecting from the under surface thereof, a sealing washer encircling said threaded closure element and contacting with the rib on its under surface, said flange having its outer periphery down-turned for gripping said washer to said flange, with the washer held in a downwardly inclined position between the down-turned periphery and the resilient backing of the flexible flange whereby a tightening of the stopper in the container flexes the flange and a continual pressure is exerted upon the washer by the flange and an inverted cup-shaped member for closing said hollow closure member to provide an insulating space therein, having external threads adapted to engage with the internal thread surface of the threaded closure member for securing said cup thereto.

FREDERICK LOBL.